(No Model.)
S. V. MILLS.
APPARATUS FOR FERTILIZERS.
No. 394,708. Patented Dec. 18, 1888.
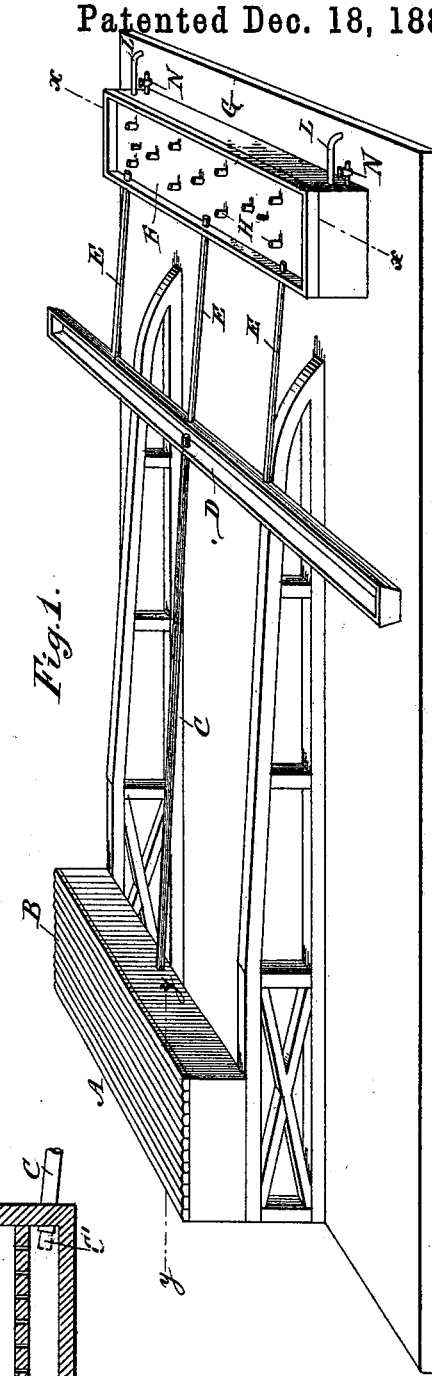
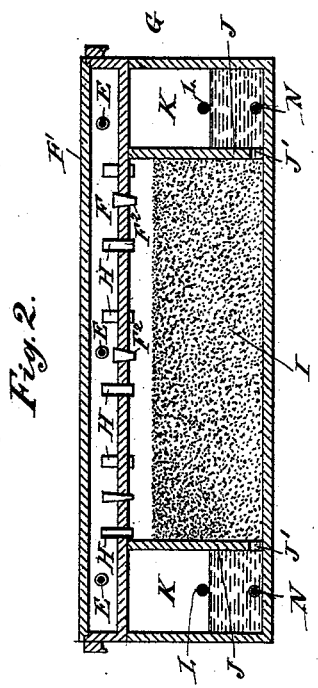
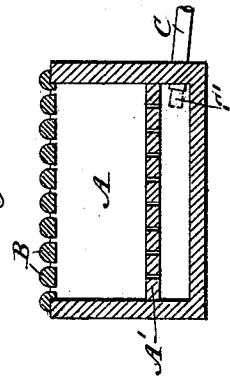
WITNESSES:
D. C. Reusch
C. Sedgwick
INVENTOR:
S. V. Mills
BY Munn & Co.
ATTORNEYS.

UNITED STATES PATENT OFFICE.

STEPHEN V. MILLS, OF RICHFIELD, PENNSYLVANIA.

APPARATUS FOR FERTILIZERS.

SPECIFICATION forming part of Letters Patent No. 394,708, dated December 18, 1888.

Application filed March 24, 1888. Serial No. 268,392. (No model.)

*To all whom it may concern:*

Be it known that I, STEPHEN V. MILLS, of Richfield, in the county of Juniata and State of Pennsylvania, have invented a new and Improved Apparatus for Collecting Liquid Manure and Converting it Into Drill-Fertilizers, of which the following is a full, clear, and exact description.

The object of the invention is to provide a new and improved apparatus for collecting liquid manures of stables and farm-yards and converting the valuable properties of the collected manures into drill-fertilizers, at the same time preventing overfermentation, fire-fang, dead-rot, &c., of the solid manure in the farm-yard.

The invention consists of a receptacle containing chemical absorbents, and connected by pipes with a trough located in the farm-yard and with a collecting-box situated in the stable.

The invention also consists of certain parts and details and combinations of the same, as will be hereinafter fully described, and pointed out in the claims.

Reference is to be had to the accompanying drawings, forming a part of this specification, in which similar letters of reference indicate corresponding parts in all the figures.

Figure 1 is a perspective view of the improvement. Fig. 2 is an enlarged transverse section of the receptacle containing chemical absorbents, and Fig. 3 is an enlarged sectional side elevation of the stable collecting-box.

The improved apparatus is provided with a collecting-box, A, located in the stable and having a removable top formed of the slats B, on which the animals stand. The slats B are placed a short distance apart, as shown in Fig. 3, so that the urine discharged by the animals passes between the slats B into the box A. In the latter is placed the perforated horizontal partition A', which prevents the coarser particles from passing to the bottom of the box A. From the latter, below the partition A', leads the slightly downwardly-inclined pipe C, which extends into the farm-yard and discharges into a trough, D, located in the farm-yard in such a manner that the liquid manure from the farm-yard discharges into it. The trough D is connected by the pipes E with a shallow receptacle, F, having a cover, F', and which forms the top or cover for the receptacle G, located at a convenient place in or outside of the farm-yard, and containing chemicals for absorbing the valuable properties of the collected liquid manure.

In the bottom of the open receptacle F are secured a number of short pipes, H, which reach to within a short distance of the top edges of the said receptacle, so that the liquid discharged into the latter is equally distributed and passes into the said short pipes H and into the central compartment, I, of the chemical-absorbent receptacle G. In the central compartment, I, is placed a mixture of about one-third of sulphate of lime and two-thirds of sand. Prior to heavy rains or washes I sprinkle on this mixture a sufficient quantity of sulphuric acid to thoroughly saturate the mixture.

In the receptacle G are formed the partitions J J at the ends of the compartment I, so as to form the chambers K K, which are connected with the central compartment by apertures J', formed in the lower edges of the said partitions J. From about the middle of the chambers K lead the pipes L for drawing off the filtered liquid manure which runs to waste, and from the bottoms of the chambers K K lead the faucets N for draining off the settlings in the said chambers whenever necessary.

The operation is as follows: The urine from the animals in the stable passes into the collecting-box A, and from the latter by the pipe C into the trough D, in which it mixes with the liquid gathering in the said trough D from the farm-yard. The mixture passes through the pipes E into the receptacle or liquid-distributer F, and is equally distributed through the small tubes H into the central compartment, I. The liquid thus passing into the compartment I rises to the bottoms of the tubes H, and finally passes through the mixture of sand and chemical absorbents, whereby the liquid is filtered and its valuable properties remain in the mixture of sand and chemical absorbents, whereby a rich drill-phosphate is obtained, which is used for enriching the fields and is distributed over the latter by any suitable machine. The filtered liquid passes through the apertures J' in the partitions J to the chambers K K, from which the filtered liquid runs to waste through the pipes L. Heavy alkali substances of the filtered liquid settle in the chambers K and are removed from the same through the faucets N, and are also used for drill-fertilizer by being mixed with the phosphate from the compartment I, or are used in any other suitable manner.

The object of the stable collecting-box is to prevent the urine of the animals from mixing with the solid manure, so that the evil effects of overfermentation, dead-rot, fire-fang, &c., of the solid manure of the farm-yard are prevented. It will be seen that by this apparatus the stables are purified and the health of the animals is preserved, as the urine is drawn off and saved as fast as it is discharged.

The pipe C, leading from the stable collecting-box, may be closed at its upper end by a plug, C', or a valve, so that the urine can accumulate in the said box. The slatted top of the latter is preferably made removable, so as to permit an easy closing of the box when necessary.

In the bottom of the receptacle F are held plugs F², which can be withdrawn, so that water can be passed into the compartment beneath for washing out the settlings in the said compartment. Sulphate of potash or other suitable substance may be employed as an absorbent.

Having thus fully described my invention, I claim as new and desire to secure by Letters Patent—

1. An absorbent-receptacle consisting of the receptacle G, divided into three compartments, I K K, and the shallow receptacle or cover F, having the cover F', and provided with short pipes H in its bottom, substantially as herein shown and described.

2. An apparatus for collecting manure, consisting of an absorbent-receptacle having a settling-chamber at each end, and provided with a receptacle-like cover provided with pipes in its bottom, a collecting-box, a trough, and pipes connecting the trough with the collecting-box and with the cover of the absorbent-receptacle, substantially as herein shown and described.

STEPHEN V. MILLS.

Witnesses:
DANIEL AMICH,
CYRUS SCHROLL.